(12) United States Patent
Thomas et al.

(10) Patent No.: US 12,119,008 B2
(45) Date of Patent: Oct. 15, 2024

(54) END-TO-END INTEGRATION OF DIALOG HISTORY FOR SPOKEN LANGUAGE UNDERSTANDING

(71) Applicants: International Business Machines Corporation, Armonk, NY (US); The Ohio State University, Columbus, OH (US)

(72) Inventors: Samuel Thomas, White Plains, NY (US); Vishal Sunder, Columbus, OH (US); Hong-Kwang Kuo, Pleasantville, NY (US); Jatin Ganhotra, White Plains, NY (US); Brian E. D. Kingsbury, Cortlandt Manor, NY (US); Eric Fosler-Lussier, Columbus, OH (US)

(73) Assignees: International Business Machines Corporation, Armonk, NY (US); The Ohio State University, Columbus, OH (US)

( * ) Notice: Subject to any disclaimer, the term of this patent is extended or adjusted under 35 U.S.C. 154(b) by 281 days.

(21) Appl. No.: 17/655,441

(22) Filed: Mar. 18, 2022

(65) Prior Publication Data

US 2023/0298596 A1    Sep. 21, 2023

(51) Int. Cl.
| | | |
|---|---|---|
| *G10L 19/00* | (2013.01) | |
| *G06F 40/126* | (2020.01) | |
| *G06N 3/045* | (2023.01) | |
| *G10L 15/00* | (2013.01) | |

(52) U.S. Cl.
CPC ............ *G10L 19/00* (2013.01); *G06F 40/126* (2020.01); *G06N 3/045* (2023.01); *G10L 15/00* (2013.01)

(58) Field of Classification Search
CPC ....... G10L 19/00; G10L 15/00; G10L 15/063; G10L 15/16; G10L 15/1822; G06F 40/126; G06F 40/35; G06N 3/045; G06N 3/0895; G06N 3/0442; G06N 3/0455; G06N 3/096
See application file for complete search history.

(56) References Cited

U.S. PATENT DOCUMENTS

| | | | |
|---|---|---|---|
| 10,861,456 B2 | 12/2020 | Tran et al. | |
| 11,017,767 B2 | 5/2021 | Schultz et al. | |
| 11,024,286 B2 | 6/2021 | Hiroe et al. | |
| 11,194,973 B1 | 12/2021 | Goel et al. | |

(Continued)

OTHER PUBLICATIONS

Gupta et al. "An Efficient Approach to Encoding Context for Spoken Language Understanding", Jul. 1, 2018, Google AI, arXiv: 1807.00267v1 [cs.CL] (Year: 2018).*

(Continued)

*Primary Examiner* — Bhavesh M Mehta
*Assistant Examiner* — Darioush Agahi
(74) *Attorney, Agent, or Firm* — Amin, Turocy & Watson, LLP

(57) ABSTRACT

Systems, computer-implemented methods, and computer program products to facilitate end to end integration of dialogue history for spoken language understanding are provided. According to an embodiment, a system can comprise a processor that executes components stored in memory. The computer executable components comprise a conversation component that encodes speech-based content of an utterance and text-based content of the utterance into a uniform representation.

20 Claims, 11 Drawing Sheets

(56) References Cited

U.S. PATENT DOCUMENTS

| | | |
|---|---|---|
| 11,222,627 B1 | 1/2022 | Qian et al. |
| 2017/0287478 A1 | 10/2017 | Schultz et al. |
| 2020/0066254 A1 | 2/2020 | Hiroe et al. |
| 2020/0090651 A1 | 3/2020 | Tran et al. |
| 2020/0402507 A1 | 12/2020 | Neelakantan et al. |
| 2021/0081609 A1 | 3/2021 | Johnson |
| 2021/0174028 A1 | 6/2021 | Zhong et al. |
| 2021/0217408 A1 | 7/2021 | Hakkani-Tur et al. |
| 2021/0287661 A1* | 9/2021 | Sharma .................. G10L 13/033 |
| 2021/0312914 A1 | 10/2021 | Hedayatnia et al. |
| 2021/0343288 A1 | 11/2021 | Zhou et al. |
| 2021/0406718 A1 | 12/2021 | Hall et al. |
| 2023/0290360 A1* | 9/2023 | Yun ....................... G10L 15/183 |

OTHER PUBLICATIONS

Wang et al. "L2 Mispronunciation Verification Based on Acoustic Phone Embedding and Siamese Networks", 2018, Beijing Language and Culture University, Beijing, China IEEE, (Year: 2018).*

Tran, T., et al. "Adaptive Global-Local Context Fusion for Multi-Turn Spoken Language Understanding". IAAI-22 34th Annual Conference On, pp. 1-7, Feb. 22-Mar. 1, 2022, 7 pages.

Ganhotra, J et al. | "Integrating Dialog History into End-to-End Spoken Language Understanding Systems". Interspeech 2021, Aug. 30-Sep. 3, 2021, Brno, Czechia, http://dx.doi.org/10.21437/Interspeech.2021-1460, 5 pages.

Joshi, R. et al. | "DialoGraph: Incorporating Interpretable Strategy-Graph Networks into Negotiation Dialogues". arXiv:2106.00920v1 [cs.CL] Jun. 2, 2021, 22 pages.

Tomashenko, N. et al. "Dialogue History Integration into End-To-End Signal-To-Concept Spoken Language Understanding Systems". arXiv:2002.06012v1 [cs.CL] Feb. 14, 2020, 5 pages.

Wu, T.-W. et al. | "A Context-Aware Hierarchical BERT Fusion Network for Multi-turn Dialog Act Detection". Interspeech 2021, Aug. 30-Sep. 3, 2021, Brno, Czechia, http://dx.doi.org/10.21437/nterspeech.2021-95, 5 pages.

Tur, G. et al. | "Improving spoken language understanding using word confusion networks". 7th International Conference on Spoken Language Processing, ICSLP2002—Interspeech 2002, Denver, Colorado, USA, Sep. 16-20, 2002, 5 pages.

Hakkani-Tur, D. et al. | "Beyond ASR 1-best: Using word confusion networks in spoken language understanding". Computer Speech & Language, vol. 20, 2006, pp. 495-514, 20 pages.

Henderson, M. et al. | "Discriminative spoken language understanding using word confusion networks," in Proc. SLT., 2012, 6 pages.

Huang, Ch.-W. et al. | "Adapting pretrained transformer to lattices for spoken language understanding," in Proc. ASRU., 2019, 8 pages.

Kuo, H.-K. et al. | "End-to-end spoken language understanding without full transcripts". arXiv:2009.14386v1 [cs.CL] Sep. 30, 2020, 5 pages.

Morais, E. | "End-to-end spoken language understanding using transformer networks and self-supervised pre-trained features". ICASSP, 2021, 5 pages.

Thomas, S. et al. | "Rnn transducer models for spoken language understanding". iarXiv:2104.03842v1 [cs.CL] Apr. 8, 2021, 5 pages.

Ghannay, S. et al. | "End-to-end named entity and semantic concept extraction from speech". arXiv:1805.12045v1 [cs.CL] May 30, 2018, 5 pages.

Bothe, Ch. et al. | "A context-based approach for dialogue act recognition using simple recurrent neural networks". arXiv:1805.06280v1 [cs.CL] May 16, 2018, 6 pages.

Raheja, V. et al. | "Dialogue act classification with context-aware self-attention," arXiv: 1904.02594v2 [cs.CL] May 6, 2019, 7 pages.

Colombo, P. | "Guiding attention in sequence-to-sequence models for dialogue act prediction". arXiv: 2002.08801v2 [cs.CL] Feb. 26, 2020, 11 pages.

Ganhotra, J. et al. | "Integrating dialog history into end-to-end spoken language understanding systems". Interspeech 2021, Aug. 30-Sep. 3, 2021, Brno, Czechia, 5 pages.

Kim, S. et al. | "Gated embeddings in end-to-end speech recognition for conversational-context fusion". arXiv:1906.11604v1 [cs.CL] Jun. 27, 2019, 11 pages.

Ray, S. N. et al. | "Listen with intent: Improving speech recognition with audio-to-intent front-end". arXiv:2105.07071v2 [eess.AS] Jun. 16, 2021, 5 pages.

Huang, Y. et al. | "Leveraging unpaired text data for training end-to-end speech-to-intent systems". arXiv:2010.04284v1 [cs.CL] Oct. 8, 2020, 5 pages.

Zhang, H. et al. | "Cross-modal contrastive learning for text-to-image generation". arXiv:2101.04702v4 [cs.CV] Jun. 9, 2021, 19 pages.

Srivastava, N. | "Improving neural networks with dropout". University of Toronto, vol. 182, 2013, 26 pages.

Wu, M. et al. | "HarperValleyBank: a domain-specific spoken dialog corpus". arXiv:2010.13929v1 [cs.LG] Oct. 26, 2020, 16 pages.

Saon, G. et al. | "Advancing RNN transducer technology for speech recognition". iarXiv:2103.09935v1 [cs.CL] Mar. 17, 2021, 5 pages.

Devlin, J. et al. | "BERT: Pre-training of deep bidirectional transformers for language understanding". arXiv:1810.04805v1 [cs.CL] Oct. 11, 2018, 14 pages.

Rongali, S. et al. | "Exploring transfer learning for end-to-end spoken language understanding". arXiv: 2012.08549v1 [cs.CL] Dec. 15, 2020, 8 pages.

Vaswani, A. et al. | "Attention is all you need". 31st Conference on Neural Information Processing Systems (NIPS 2017), Long Beach, CA, USA, 11 pages.

* cited by examiner

801 → 810, 812, 814

| Max. no of frames (N) | F1 | Train time (min/epoch) |
|---|---|---|
| 64 | 56.5 | 4 |
| 256 | 61.7 | 8 |
| 1024 | 60.2 | 25 |
| Full | 59.9 | 27 |

816 → 256 row
818 → Full row

| Model style | Model | F1 | #Params (M) |
|---|---|---|---|
| Cascaded | (1) ASR → BERT (on context) | 62.2 | 168 |
| End-to-End | (2) HIER-S | 58.3 | 88 |
| | (3) HIER-ST + $L_{CON}$ | 61.7 | 88 |
| | (4) HIER-ST + $L_{CON}$ (LSTM conv enc.) | 61.3 | 62 |

| Model style | Model | F1 | #Params (M) |
|---|---|---|---|
| Cascaded | (1) ASR → BERT (on context) | 50.3 | 168 |
| End-to-End | (2) HIER-S | 57.7 | 88 |
| | (3) HIER-ST + $L_{CON}$ (w/ ASR text) | 60.3 | 88 |

END-TO-END INTEGRATION OF DIALOG HISTORY FOR SPOKEN LANGUAGE UNDERSTANDING

BACKGROUND

The subject disclosure relates to spoken language understanding, and more specifically, to end-to-end integration of dialog history for spoken language understanding.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate end-to-end integration of dialogue history for spoken language understanding are provided.

According to an embodiment, a system can comprise a processor that executes computer executable components stored in memory. The computer executable components comprise a conversational component that encodes speech-based content of an utterance and text-based content of an utterance into a uniform representation.

According to another embodiment, a computer-implemented method can comprise encoding, by a system, operatively coupled to a processor, speech-based content of an utterance and text-based content of the utterance into a uniform representation.

According to another embodiment, a computer program product comprising a computer readable storage medium having program instructions embodied therewith, the program instructions executable by a processor to cause the processor to encode speech-based content of an utterance and text-based content of an utterance into a uniform representation.

DESCRIPTION OF THE DRAWINGS

FIG. 8A illustrates a chart representation of the impact of dropping frames during the training process in accordance with one or more embodiments described herein.

FIG. 8B illustrates a chart representation of a comparison of the performance and model size of end-to-end models and an existing cascaded style model with gold transcripts in accordance with one or more embodiments described herein.

FIG. 8C illustrates a chart representation of a comparison of the performance and model size of end-to-end models and an existing cascaded style model without gold transcripts in accordance with one or more embodiments described herein.

DETAILED DESCRIPTION

Figure 1:
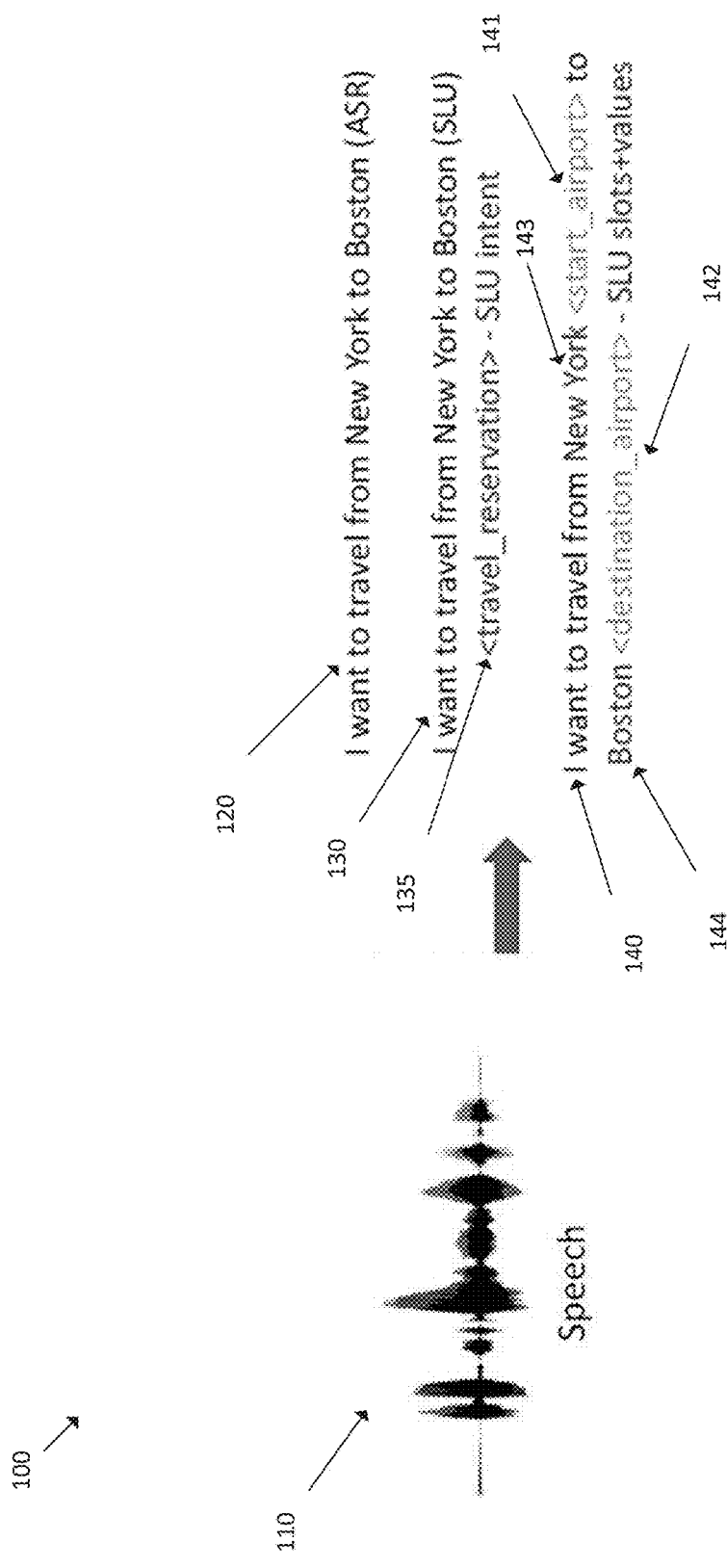
FIG. 1 illustrates a flow diagram of an example, non-limiting method that can facilitate performance of spoken language understanding in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As referenced herein, an "entity" can comprise a client, a user, a computing device, a software application, an agent, a machine learning (ML) model, an artificial intelligence (AI) model, and/or another entity.

Use of spoken language understanding (SLU) has great potential to address a variety of problems in a number of different domains. For example, spoken language understanding can enable speech to be used as an input in various computer products or allow for an entity to control a device through voice commands. Use of dialogue history can be used to improve spoken language understanding by providing context for a speech utterance.

In order to improve performance, existing spoken language understanding systems utilize dialog history in order to resolve ambiguities, co-references, and co-occurrences of the same word. However, existing spoken language understanding systems use dialog history in text form in conjunction with an automatic speech recognition (ASR) component and a natural language understanding (NLU) component. Existing ASR and NLU models are inherently large, having large memory and storage usage, and a model implementing both causes cascading, which leads to an even larger overall model size and can degrade performance of spoken language understanding.

Given problems described above with existing SLU technologies, the present disclosure can be implemented to produce a solution to these problems in the form of systems, computer-implemented methods, and/or computer program products that can facilitate end-to-end integration of dialog history for spoken language understanding by: encoding speech-based content of an utterance and text-based content of the utterance into a uniform representation.

In some embodiments, the present disclosure can be implemented to produce a solution to the problems described above in the form of systems, computer-implemented methods, and/or computer program products that can further facilitate end-to-end integration of dialog history for spoken language understanding by: encoding the utterance and speech-based context of the utterance and the text of the utterance and text-based context of the utterance. An advantage of such systems, computer-implemented methods, and/or computer program products is that they can be used as a hierarchical model with lower level encoder and an upper level encoder, which facilitates end-to-end integration of dialogue history in spoken form.

FIG. 1 illustrates a flow diagram 100 of an example, non-limiting method that can facilitate performance of spoken language understanding in accordance with one or more embodiments described herein.

As shown at 110, a system, such as spoken language understanding system 201 described in greater detail below in reference to FIGS. 2 and 3, can receive as input, speech in an audio form. At 120, the system can identify an utterance within the speech such as the utterance "I want to travel from New York to Boston." At 130, the system can identify an intent of the utterance or a category to which the utterance belongs using a classifier. In the present example, the intent or category 135 of the utterance "I want to travel from New York to Boston" is a travel reservation. At 140, the system can identify slots and values in the utterance based on the intent or category. For example, the system can identify slots 141 and 142 as the departure point and destination point based on the intent 135 of a travel reservation. The system can then identify values that fit into slots 141 and 142. For example, the system can identify value 143 "New York" as the departure point and value 144 "Boston" as the destination point. During this process, context, such as dialog history comprising previous utterances, can assist the system in making more accurate determinations. For example, dialogue history may provide context in order to determine whether "New York" referrers to New York City or New York state.

Figure 2:
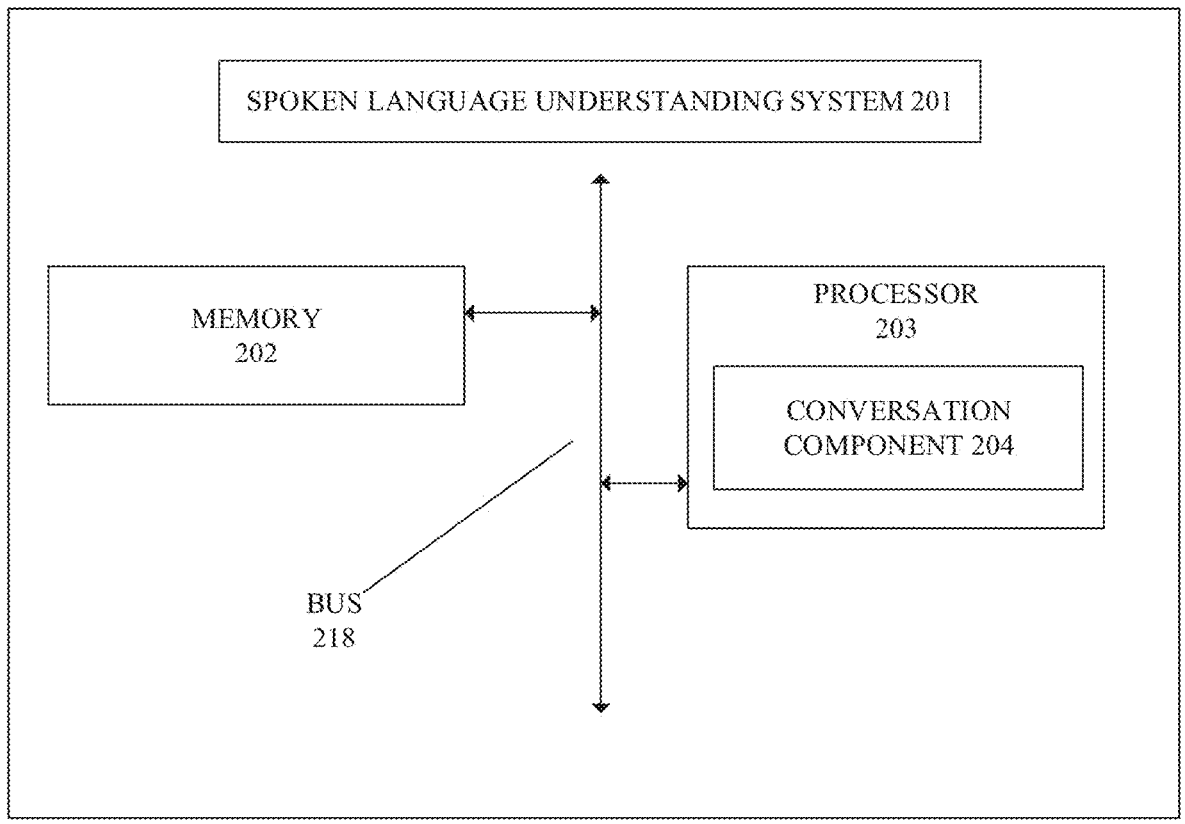
FIG. 2 illustrates a block diagram of an example, non-limiting system that can facilitate end-to-end integration of dialogue history for spoken language understanding in accordance with one or more embodiments described herein.
Figure 3:
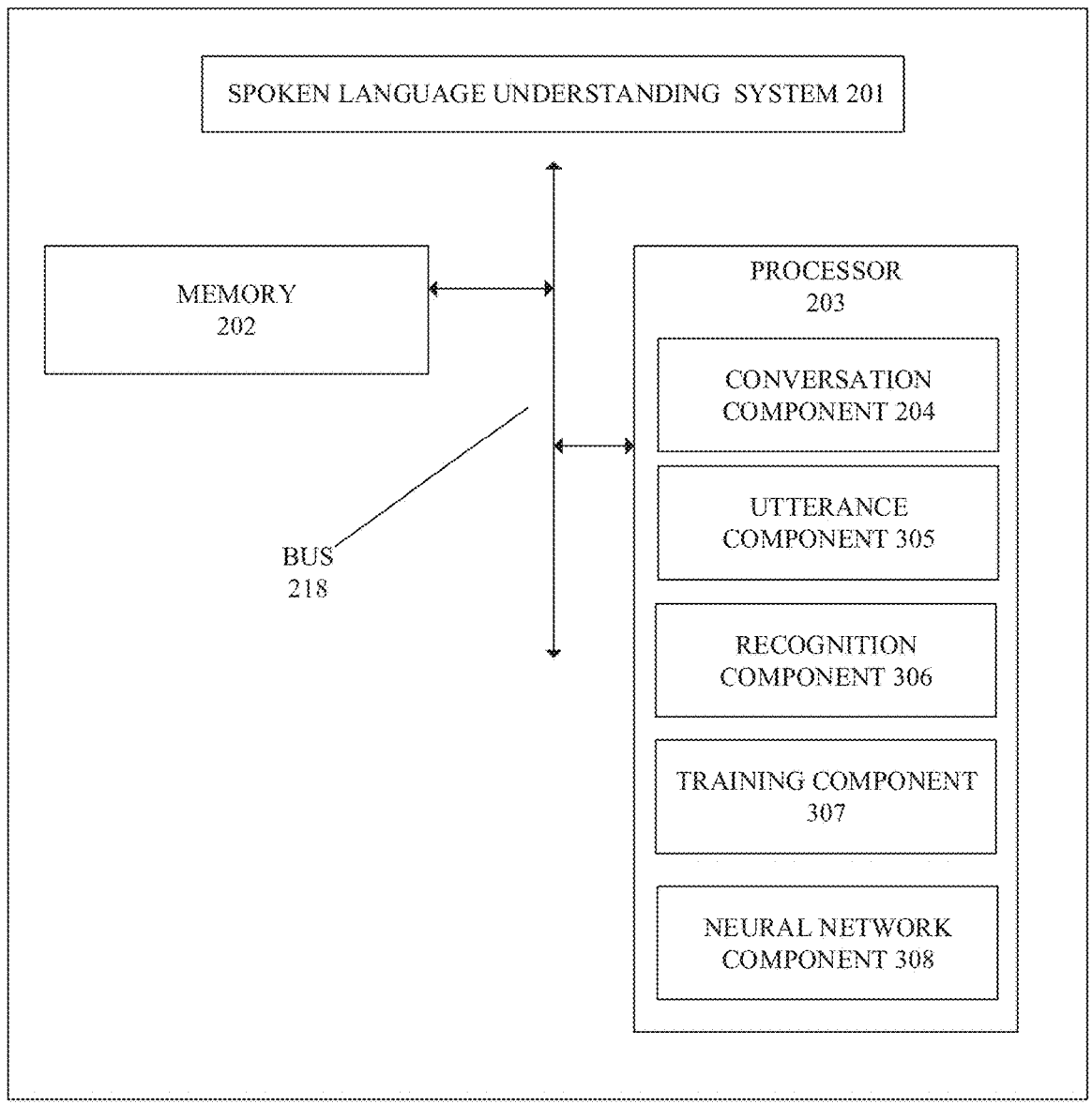
FIG. 3 illustrates a block diagram of an example, non-limiting system that can facilitate end-to-end integration of dialogue history for spoken language understanding in accordance with one or more embodiments described herein.

FIGS. 2 and 3 illustrate block diagrams of example, non-limiting systems 200 and 300 respectively, that can enable end-to-end integration of dialog history in spoken language understanding. System 200 can comprise spoken language understanding system 201. Spoken language understanding system 201 of system 200 can comprise a memory 202, a processor 203, a conversation component 204, and/or a bus 218. Spoken language understanding system 201 of system 300, depicted in FIG. 3, can further comprise, an utterance component 305, a recognition component 306, a training component 307, and a neural network component 308.

It should be appreciated that the embodiments of the subject disclosure depicted in various figures are for illustration only, and as such, the architecture of such embodiments are not limited to the systems, devices, and/or components depicted therein. For example, in some embodiments, system 200, system 300 and/or spoken language understanding system 201 can further comprise various computer and/or computing-based elements described herein with reference to operating environment 1100 and FIG. 11. In several embodiments, such computer and/or computer-based elements can be used in connection with implementing one or more of the systems, devices, components, and/or computer-implemented operations shown described in connection with FIG. 2, FIG. 3, and/or other figures disclosed herein.

Memory 202 can store one or more computer and/or machine readable, writable, and/or executable components and/or instructions that, when executed by processor 203 (e.g., a classical processor, a quantum processor, and/or another type of processor), can facilitate performance of operations defined by executable component(s) and/or instruction(s). For example, memory 202 can store computer and/or machine readable, writable, and/or executable components and/or instructions that, when executed by processor 203, can facilitate execution of the various functions described herein relating to spoken language understanding system 201, conversation component 204, utterance component 305, recognition component 306, training component 307, neural network component 308, and/or another component associated with spoken language understanding system 201.

Memory 202 can comprise volatile memory (e.g., random access memory (RAM), static RAM (SRAM) dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volitive memory) that can employ one or more memory architectures. Further examples of memory 202 are described below with reference to system memory 1116 and FIG. 11. Such examples of memory 202 can be employed to implement any embodiments of the subject disclosure.

Processor 203 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 202. For example, processor 203 can perform various operations that can be specified by such computer and/or machine readable, writable, and/or executable components and/or instructions including, but not limited to, logic, control, input/output (I/O), arithmetic, and/or the like. In some embodiments, processor 203 can comprise one or more central processing unit, multi-core processor, microprocessor, dual microprocessors, microcontroller, System on a Chip (SOC), array processor, vector processor, quantum processor, and/or another type of processor. Further examples of processor 203 are described below with reference to processing unit 1114 and FIG. 11. Such examples of processor 203 can be employed to implement any embodiments of the subject disclosure.

Spoken language understanding system 201, memory 202, processor 203, conversation component 204, utterance component 305, recognition component 306, training component 307, neural network component 308, and/or another component of spoken language understanding system 201 as described herein can be communicatively, electrically, operatively, and/or optically coupled to one another via bus

218 to perform functions of system 200, system 300, spoken language understanding system 201, and/or any components coupled therewith. Bus 218 can comprise one or more memory bus, memory controller, peripheral bus, external bus, local bus, quantum bus, and/or another type of bus that can employ various bus architectures. Further examples of bus 218 are described below with reference to system bus 1118 and FIG. 11. Such example of bus 218 can be employed to implement any embodiments of the subject disclosure.

Spoken language understanding system 201 can comprise any type of component, machine, device, facility, apparatus, and/or instrument that comprises a processor and/or can be capable of effective and/or operative communication with a wired and/or wireless network. All such embodiments are envisioned. For example, spoken language understanding system 201 can comprise a server device, a computing device, a general-purpose computer, a special-purpose computer, a quantum computing device (e.g., a quantum computer), a tablet computing device, a handheld device, a sever class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia player, and/or another type of device.

Spoken language understanding system 201 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or cable. For example, spoken language understanding system 201 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, spoken language understanding system 201 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). Spoken language understanding system 201 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, spoken language understanding system 201 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between spoken language understanding system 201 and external systems, sources, and/or devices (e.g., computing devices, communication devices, and/or another type of external system, source, and/or device).

Spoken language understanding system 201 can comprise one or more computer and/or machine readable, writable, and/or executable components and/or instructions that, when executed by processor 203 (e.g., a classical processor, a quantum processor, and/or another type of processor), can facilitate performance of operations defined by such component(s) and/or instruction(s). Further, in numerous embodiments, any component associated with spoken language understanding system 201, as described herein with or without reference to the various figures of the subject disclosure, can comprise one or more computer and/or machine readable, writable, and/or executable components and/or instructions that, when executed by processor 203, can facilitate performance of operations defined by such component(s) and/or instruction(s). For example, conversation component 204, utterance component 305, recognition component 306, training component 307, neural network component 308 and/or any other components associated with spoken language understanding system 201 as disclosed herein (e.g., communicatively, electronically, operatively, and/or optically coupled with and/or employed by spoken language understanding system 201), can comprise such computer and/or machine readable, writable, and/or executable component(s) and/or instruction(s). Consequently, according to numerous embodiments, spoken language understanding system 201 and/or any components associated therewith as disclosed herein, can employ processor 203 to execute such computer and/or machine readable, writable, and/or executable component(s) and/or instruction(s) to facilitate performance of one or more operations described herein with reference to spoken language understanding system 201 and/or any such components associated therewith.

Spoken language understanding system 201 can facilitate (e.g., via processor 203) performance of operations executed by and/or associated with conversation component 204, utterance component 305, recognition component 306, training component 307, neural network component 308 and/or another component associated with spoken language understanding system 201 as disclosed herein. For example, as described in detail below, spoken language understanding system 201 can facilitate (e.g., via processor 203): encoding speech-based content of an utterance and text-based content of the utterance into a uniform representation. In another example, as described in detail below, spoken language understanding system 201 can further facilitate training a hierarchical conversational model using one or more cross-model loss functions for the recognized spoken language understanding categories, slots and values of the speech-based content and the text-based content.

Conversation component 204 can encode speech-based content of an utterance and text-based content of the utterance into a uniform representation. As described herein, content of an utterance can comprise the utterance itself and context of the utterance, wherein context is the dialog history made up of previous utterance in a conversation. In an embodiment, conversation component 204 can receive both the speech-based content of an utterance and the text-based content of the utterance. For example, conversation component 204 can receive speech-based content denoted as $U^s$ and text-based content denoted as $U^t$. Conversation component 204 can then use a neural network higher level sequence encoder, $g(.; \phi)$ to encode $U^s$ and $U^t$ into a uniform representation. For example, the speech-based content can be encoded as $c^s = g(U^s; \phi)$ and the text-based content can be encoded as $c^t = g(U^t; \phi)$, wherein $\phi$ is a parameter of the encoder. As the sequence encoder is shared between the speech-based content and the text-based content, the text-based content can be used to transfer knowledge from text to speech during the training process described in detail below. In an embodiment, sequence encoder, $g(.; \phi)$ can be modeled as a 6-layer 1-head transformer.

Utterance component 305 can encode an utterance and speech-based context of the utterance and the text of the utterance and text-based context of the utterance. For example, an SLU problem can be treated as a context labeling task, where instead of labeling the current utterance, a model can label the entire context (dialog history+current utterance). As such, utterance component 305 can receive speech-based context $C^s = \{x_1^s, x_2^s, \ldots, x_N^s\}$ where $x_N^s$ is the current utterance and the rest is dialog history. Similarly, utterance component 305 can also receive text-based context $C^t = \{x_1^t, x_2^t, \ldots, x_N^t\}$, wherein $C^t$ is a transcript of $C^s$. In an embodiment, utterance component 305 can comprise a speech encoder component and a text encoder component.

For example, a speech encoder component of utterance component 305 can use a neural network with the speech encoder $f^s(.; \theta^s)$ parameterized by $\theta^s$. The speech signal $x_i^s$, from the $i^{th}$ utterance in the context can be encoded as $u_i^s = f^s(x_i^s; \theta^s)$. Therefore, the entirety of the encoded speech context can be denoted as $U^s = \{u_i^s\}_{i=1}^N$, which can be passed to conversation component 204 as input. In an embodiment, speech encoder component can use the transcription network of a pretrained recurrent neural network transducer (RNN-T) based ASR model as the speech encoder, which encodes the speech signal directly to give a vector representation. This can be pre-trained for ASR using a 40-dimensional global mean and variance normalized log-mel filterbank features, extracted every 10 ms. These features can be further augmented with $\Delta$ and $\Delta\Delta$ coefficients, every two consecutive frames are stacked, and every second frame is skipped, resulting in 240-dimensional vectors every 20 ms. Thus, $x_i^s$ can be a sequence of 240-dimensional log-mel features. The encoder, $f^s(.; \theta^s)$ can be a 6-layer bidirectional long short-term memory (LSTM) with 640 cells per layer per direction. The speech encoder component can concatenate vectors from the forward and backward direction of the last layer of the LSTM for the last time step to produce a 1280-dimensional vector. This vector can go through a linier layer which shrinks dimensionality of the vector to 768. Thus, $u_i^s$ can be a 768-dimensional representation of a speech utterance.

Additionally, a text encoder component of utterance component 305 can use a neural network with the text encoder $f^t(.; \theta^t)$ parameterized by $\theta^t$. The $i^{th}$ text utterance, $x_i^t$, can be a sequence of word tokens encoded using Word Piece embeddings, or any other suitable embeddings. As such, text encoder component can encode $x_i^t$ as $u_i^t = f^t(x_i^t; \theta^t)$. Therefore, the entirety of the encoded speech context can be denoted as $U^t = \{u_i^t\}_{i=1}^N$, which can be passed to conversation component 204 as input. In an embodiment, text encoder component can use a pretrained bidirectional encoder representations from transformer (BERT) model. The 768-dimensional token output from this model can be treated as the text representation $u_i^t$. In an embodiment, the speech encoder component can be a "student" in a student-teacher joint training framework and the text encoder can be a "teacher" in the student-teacher joint training framework. In a student-teacher joint training framework, a "teacher" component is used to transfer knowledge to a "student" component. As such, it should be appreciated the text encoder component can be used during the training process, described in greater detail below, to transfer semantic knowledge to the speech encoder component and then the text encoder component can be discarded after training and/or during performance of SLU operations, thus making the system fully end-to-end.

Recognition component 306 can recognize at least one of spoken language understanding categories, slots or values from at least one of the speech-based content of the text-based content. For example, recognition component 306 can comprise a classification layer of a neural network that receives the encoded speech-based content and the encoded text-based content $c^t$ and $c^s$ from conversation component 204. Examples, of classification layers include support vector machines, Bayesian networks, decisions trees, neural networks, fuzzy logic models, probabilistic classification models, or any other suitable classifier. The classification layer can then generate a prediction of a spoken language understanding category (e.g., an intent), slots, and/or values. In an embodiment, recognition component 306 can make a prediction of a category or intent. For example, based on the encoded content, the classification layer can determine probabilities that an utterance belongs to one or more categories. Based on the probabilities, the classification layer can select the option with the highest probability as the category or intent. Based on the predicted category or intent, recognition component 306 can then predict slots that correspond to the predicted category or intent and values to fill the slots. For example, recognition component 306 can predict that an utterance has an intent of a travel reservation. Based on that intent, recognition component 306 can then predict slots, such as a departure point and a destination point, and values to fill those slots such as "New York" as a departure point and "Boston" as a destination point. In an embodiment, recognition component 306 can identify multiple categories or intents. For example, if recognition component 306 predicts an intent of a travel reservation, recognition component 306 can then predict an intent of a type of travel reservation such as a flight reservation or a train reservation.

Training component 307 can train a hierarchical conversation model using one or more cross-model loss functions. In an embodiment, the one or more cross-model loss functions can be based on the recognized spoken language understanding categories, slots and/or values for the speech-based content and/or the text-based content. For example, training component 307 can compare the categories, slots and values recognized using text to the categories, slots and values recognized using speech. Training component 307 can the train utterance component 305 and conversation component 204 to minimize the difference. In an embodiment, conversation component 204 and utterance component 305 can comprise a hierarchical conversational model with utterance component serving as a lower level and conversation component 204 serving as a top layer. Training component 307 can then compute binary cross-entropy loss for the speech modalities, denoted as $L_{BCE}(\theta^s, \phi)$, and for the text modalities, denoted as $L_{BCE}(\theta^t, \phi)$. In an embodiment, the hierarchical model can be trained in one of three ways, co-trained with speech and text using $L_{BCE}(\theta^s, \phi) \pm L_{BCE}(\theta^t, \phi)$, referred to as HIER-ST, trained with speech only using $L_{BCE}(\theta^s, \phi)$, referred to as HEIR-S, or trained with text only using $L_{BCE}(\theta^t, \phi)$, referred to as HIER-T. By using cross-model loss functions, semantic knowledge can be transferred from a text encoder component of utterance component 305 to a speech encoder component of utterance component 305 and to conversation component 204. In an embodiment, a Euclidean loss function, $L_{EUC}$, can be computed as the L2 distance between the text and speech representations. Formally, $$L_{EUC}(\theta^s) = \frac{1}{|B|} \sum_{i=1}^{|B|} \|u_N^s[i] - u_N^t[i]\|_2$$

where $|B|$ is batch size; $u_N^s[i]$ and $u_N^t[i]$ are respective outputs from $f^s(.;\ \theta^s)$ and $f^t(.;\ \theta^t)$ respectively of the $i^{th}$ utterance in the batch. In another embodiment, contrastive loss, $L_{CON}$, can be used. For example, the similarity between the $i^{th}$ speech utterance and the $j^{th}$ text utterance in a training batch can be defined as $s_{ij} = \cos(u_N^s[i], u_N^t[j])\tau$ where $\cos(.,.)$ is the cosine similarity and $\tau$ is a temperature hyperparameter. Then, contrastive loss can be defined as $$L_{CON}(\theta^s) = -\frac{1}{2|B|} \sum_{i=1}^{|B|} \left( \log \frac{\exp(s_{ii})}{\sum_{j=1}^{|B|} \exp(s_{ij})} + \log \frac{\exp(s_{ii})}{\sum_{j=1}^{|B|} \exp(s_{ji})} \right)$$

The first term in the above sum is the log-likelihood of a text utterance given the corresponding speech and the second term, vice-versa. By minimizing the above loss, the similarity between same utterances in text and speech is maximized and the difference between different utterances is minimized. In an embodiment, these gradients can be used to update and train only the speech component of utterance component 305 and conversation component 204, in order to train spoken language understanding system to operate without text once fully trained.

When compared to a sequence of text tokens, the corresponding sequence of speech frames can be longer, up to five times longer in some instances. As such, when dialog history is used in speech form, the speech sequence can be comparatively long resulting in increased training time for end-to-end models as well as increased memory requirements for the training process. To address this issue, training component 307 can drop one or more speech frames during training. By dropping speech frames, training time can be decreased while also improving performance. For example, if the length of sequence $x_i^s$ is longer than a hyperparameter l, training component 307 can randomly drop out some of the frames in $x_s^i$ until the length of $x_i^s$ equals l. As described in greater detail below in regard to FIG. 8A, this can result in decreased training time as well as improved performance and accuracy of the trained model.

Neural network component 308 can perform spoken language understanding by applying the hierarchical conversational model to a speech conversation. For example, in an embodiment, utterance component 305 and conversation component 204 can be utilized in a hierarchical neural network model, wherein utterance component 305 serves as a lower level encoder and conversation component 204 serves as an upper level encoder. As discussed above in relation to training component 307, text is utilized during training to transfer semantic knowledge from a text encoder component to a speech encoder component within utterance component 305. As such, when performing SLU after training, only the speech of a conversation is utilized. In an embodiment, neural network component 308 can receive a speech conversation and a request to perform an SLU operation on the speech conversation. Neural network component 308 can then apply the hierarchical model comprising utterance component 305 and conversation component 204 to the speech conversation. For example, utterance component 305 can receive speech-based context $C^s = \{x_1^s, x_2^s, \ldots, x_N^s\}$ of the speech conversation from neural network component and encode $C^s = \{x_1^s, x_2^s, \ldots, x_N^s\}$ as $U^s = \{u_i^s\}_{i=1}^{N}$ as described above. Conversation component 204 can then encode $U^s$ as $c^s = g(U^s;\ \phi)$. This encoding can then be passed to recognition component 306. Based on the type of SLU request received by neural network component 308, recognition component 306 can recognize at least one of SLU categories, slots and/or values, which can then be return as an output. It should be appreciated that spoken language understanding system 201 thereby enables end-to-end integration of dialogue history in SLU operations as text is not utilized to provide context or act as dialogue history during performance of SLU operations. It should also be appreciated, that in an embodiment, SLU operations can be performed without training. For example, neural network component 308 can perform spoken language understanding by applying the hierarchical model to a speech conversation prior to or absent of the hierarchical model being trained by training component 307.

Figure 4:
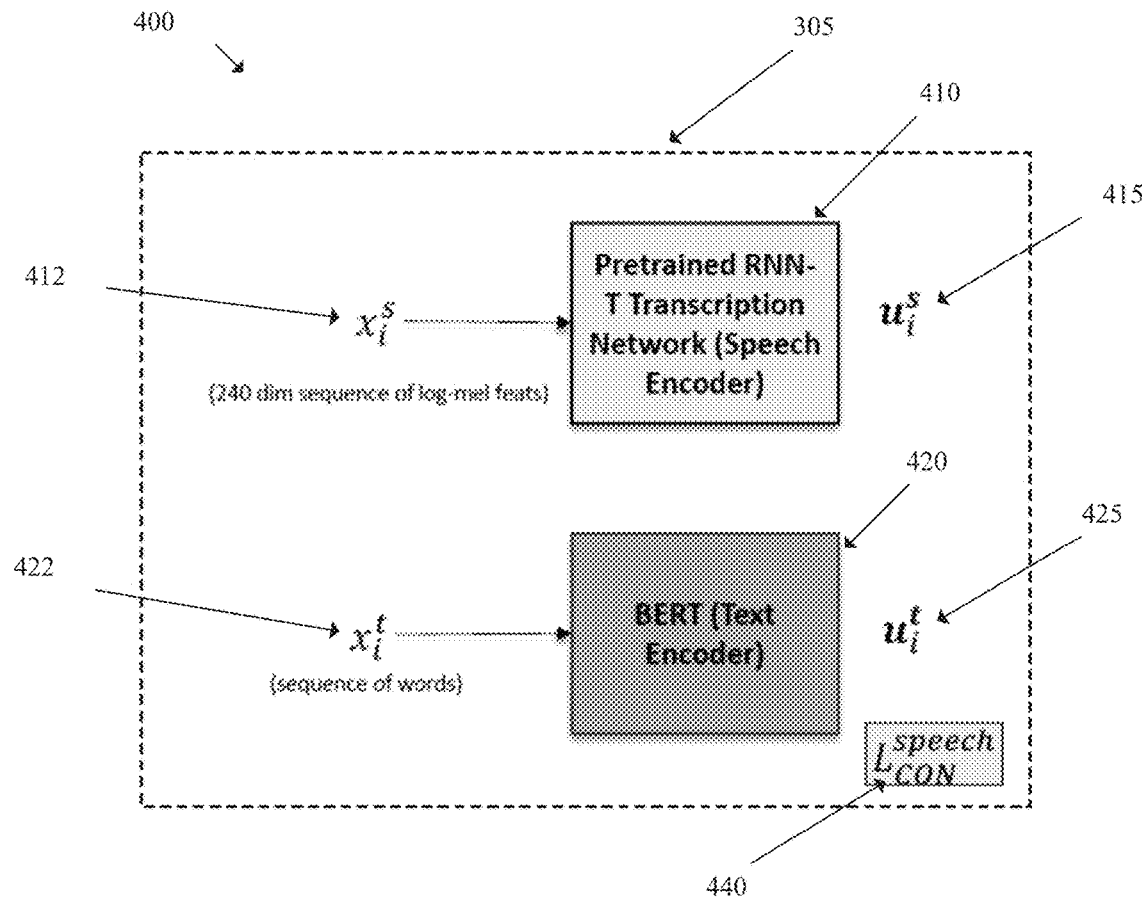
FIG. 4 illustrates a flow diagram of an example, non-limiting method that can facilitate training of an utterance component in accordance with one or more embodiments described herein.

FIG. 4 illustrates a flow diagram of an example, non-limiting method 400 that can facilitate training of utterance component 305 in accordance with one or more embodiments described herein.

As shown, utterance component 305 can comprise two parts, speech encoder component 410 and text encoder component 420. As described above in reference to FIG. 3, in an embodiment, text encoder component 420 can be a BERT encoder. At 412, speech encoder component 410 can receive speech signal $x_i^s$, from the $i^{th}$ utterance in speech-based context $C^s = \{x_1^s, x_2^s, \ldots, x_N^s\}$, wherein $x_N^s$ is the current utterance and the rest is dialog history. At 415, speech encoder component 410 can encode $x_i^s$ using a neural network with the encoder $f^s(.;\ \theta^s)$ to output the encoded context as $u_i^s$. It should be appreciated that in an embodiment, speech encoder component 410 can repeat the encoding process for all utterances in $C^s = \{x_1^s, x_2^s, \ldots, x_N^s\}$ to produce the entirety of the encoded speech context denoted as $U^s = \{u_i^s\}_{i=1}^{N}$.

At 422, text encoder component 420 can receive $x_i^t$, the $i^{th}$ text utterance from text-based context $C^t = \{x_1^t, x_2^t, \ldots, x_N^t\}$. In an embodiment, $x_i^t$ can be a sequence of word tokens generated using a suitable word embedding. At 425, text encoder component 420 can encode $x_i^t$ using the text encoder $f^t(.;\ \theta^t)$ to produce $u_i^t = f^t(x_i^t;\ \theta^t)$. It should be appreciated that in an embodiment, text encoder component 420 can repeat the encoding process for all utterances in $C^t = \{x_1^t, x_2^t, \ldots, x_N^t\}$ to produce the entirety of the encoded text context denoted as $U^t = \{u_i^t\}_{i=1}^{N}$.

At 440, training component 307 can train speech encoder component 410 using one or more cross-model loss functions. For example, as described above with reference to FIG. 3, training component 307 can compute the contrastive loss between $u_i^s$ and $u_i^t$ in order to minimize the difference between the two encodings. By doing so, this training process can pass semantic knowledge from text encoder component 420 to speech encoder component 410 in order to enable speech encoder component 410 to perform accurately at deployment time without text encoder component 420, thereby enabling end-to-end integration of dialogue history in speech form. As shown, the training at 440 comprises contrastive loss, but it is to be appreciated that Euclidean loss, or any other suitable binary cross-entropy loss function can be utilized.

Figure 5:
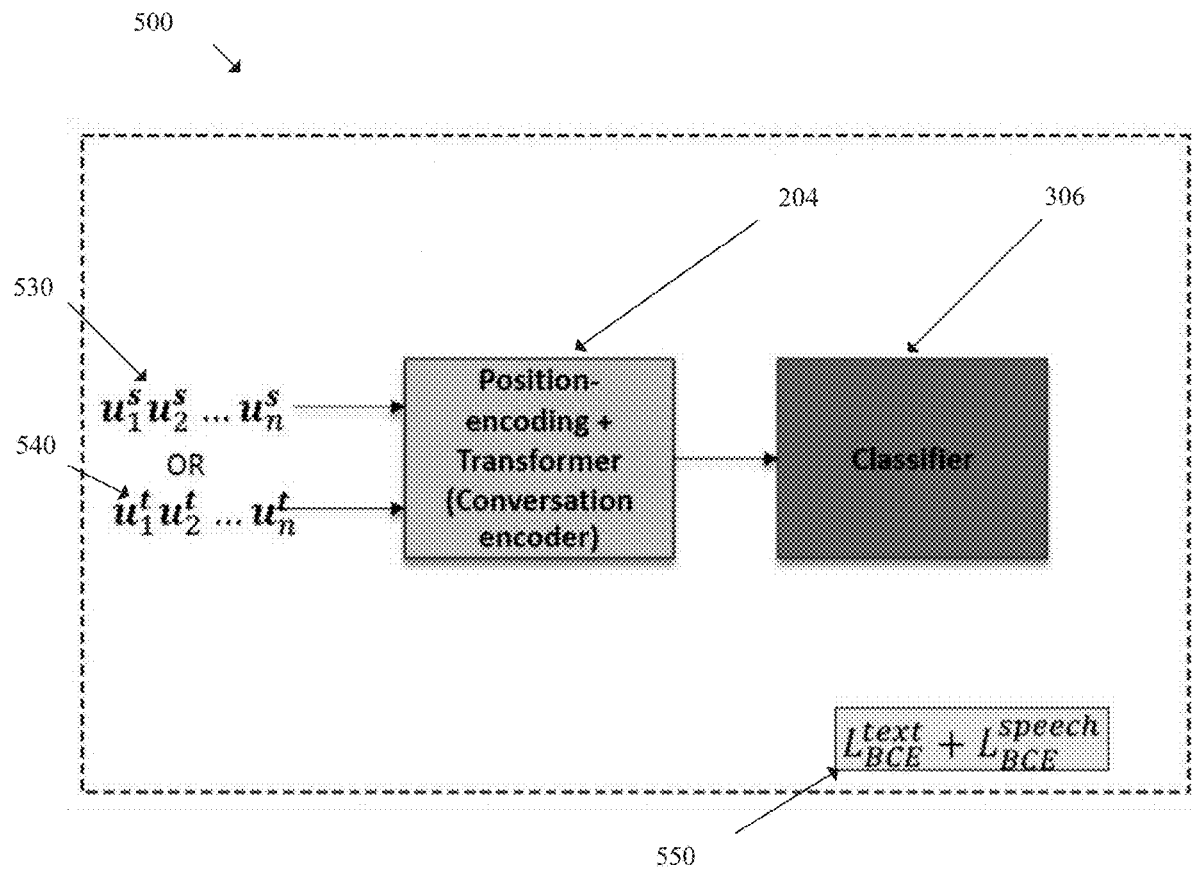
FIG. 5 illustrates a flow diagram of an example, non-limiting method that can facilitate training of a conversation component in accordance with one or more embodiments described herein.

FIG. 5 illustrates a flow diagram of an example, non-limiting method 500 that can facilitate training of conversation component 204 in accordance with one or more embodiments described herein.

At 530, conversation component 204 can receive $U^s = \{u_i^s\}_{i=1}^N$ as encoded by speech encoder component 410. Similarly at 540, conversation component 204 can receive $U^t = \{u_i^t\}_{i=1}^N$ as encoded by text encoder component 420. Conversation component 204 can then encode $U^s$ and $U^t$ using the neural network higher level sequence encoder $g(.; \phi)$ to produce $c^s = g(U^s; \phi)$ and $c^t = g(U^t; \phi)$. $c^s$ and $c^t$ can then be passed to recognition component 306, shown here as a classifier. Recognition component 306 can then generate predictions for SLU categories, slots, and/or values using $c^s$ and $c^t$. At 550, training component 307 can train conversation component 204 using binary cross loss entropy between $c^s$ and $c^t$. It should be appreciated that in an embodiment, the training processes described in FIGS. 4 and 5 can be repeated multiple times. For example, the training process can repeat for a set number of iterations, for a set amount of time or until a threshold accuracy level is met or surpassed.

Figure 6:
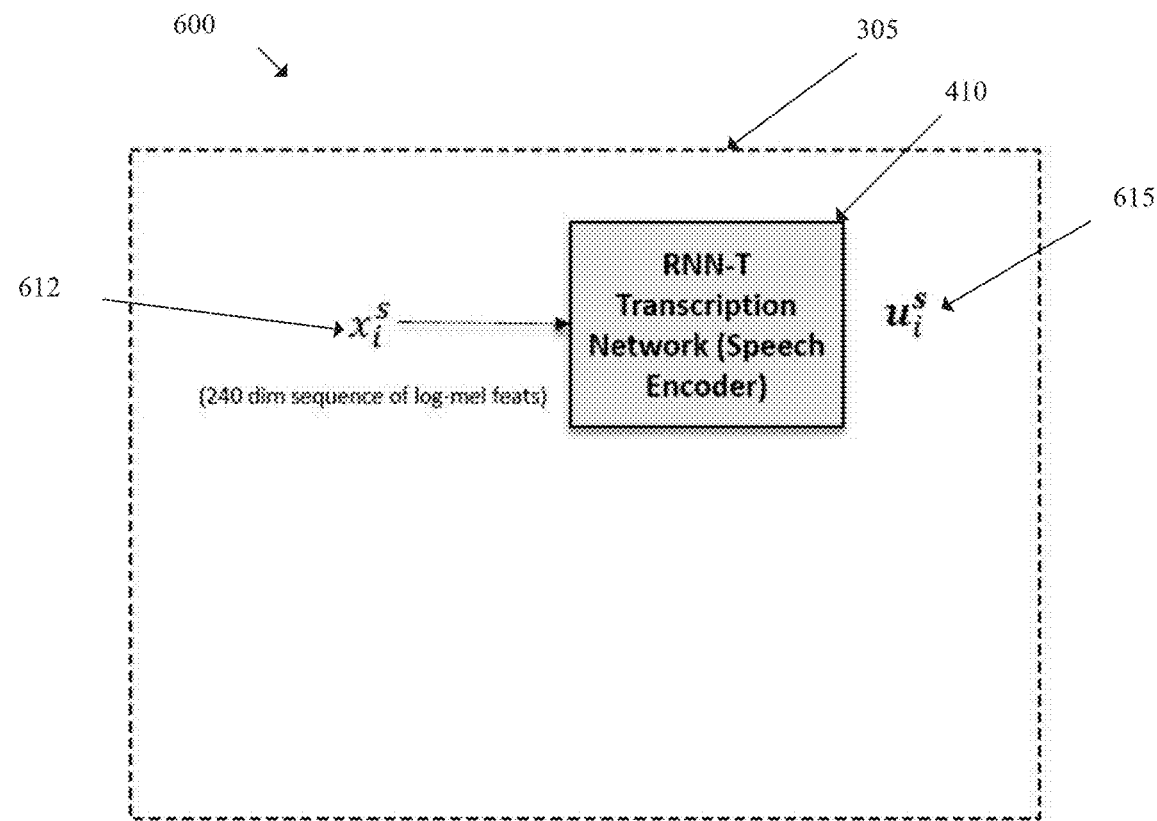
FIG. 6 illustrates a flow diagram of an example, non-limiting method that can facilitate performance of spoken language understanding in accordance with one or more embodiments described herein.

FIG. 6 illustrates a flow diagram of an example, non-limiting method 600 that can facilitate performance of spoken language understanding in accordance with one or more embodiments described herein.

At 612 speech encoder component 410, of utterance component 305, can receive speech signal $x_i^s$, from the i$^{th}$ utterance in speech-based context $C^s = \{x_1^s, x_2^s, \ldots, x_N^s\}$, wherein $x_N^s$ is the current utterance and the rest is dialog history. At 615, speech encoder component 410 can encode $x_i^s$ using a neural network with the encoder $f^s(.; \theta^s)$ to output the encoded context as $u_i^s$. It should be appreciated that in an embodiment, speech encoder component 410 can repeat the encoding process for all utterances in $C^s = \{x_1^s, x_2^s, \ldots, x_N^s\}$ to produce the entirety of the encoded speech context denoted as $U^s = \{u_i^s\}_{i=1}^N$. It should be appreciated that as speech encoder component 410 was previously trained in reference to FIG. 4, text encoder component 420 is not utilized during performance of SLU operations.

Figure 7:
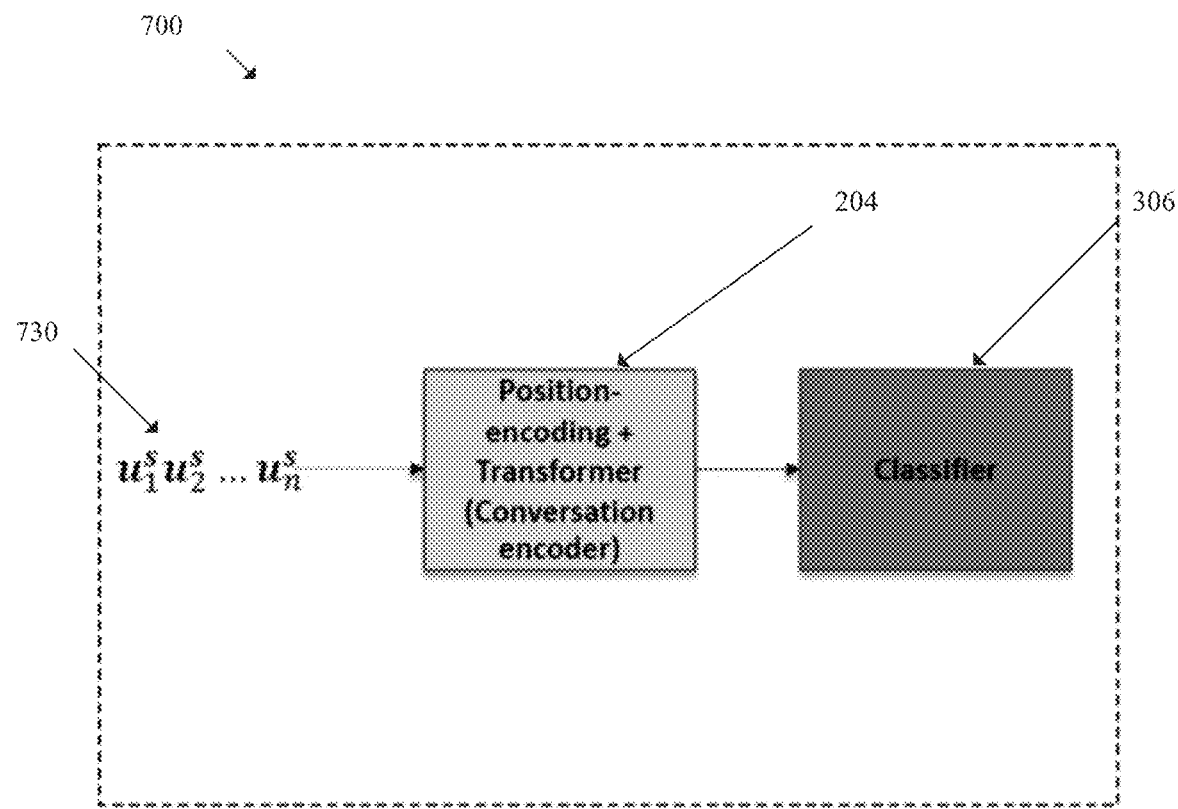
FIG. 7 illustrates a flow diagram of an example, non-limiting method that can facilitate performance of spoken language understanding in accordance with one or more embodiments described herein.

FIG. 7 illustrates a flow diagram of an example, non-limiting method 700 that can facilitate performance of spoken language understanding in accordance with one or more embodiments described herein.

At 730, conversation component 204 can receive $U^s = \{u_i^s\}_{i=1}^N$ as encoded by speech encoder component 410. Conversation component 204 can then encode $U^s$ using the neural network higher level sequence encoder $g(.; \phi)$ to produce $c^s = g(U^s; \phi)$. $c^s$ can then be passed to recognition component 306, shown here as a classifier. Recognition component 306 can then generate predictions for SLU categories, slots, and/or values using $c^s$. It should be appreciated that as conversation component 204 was previously trained in reference to FIG. 5, conversation component 204 does not receive or utilize $U^t = \{u_i^t\}_{i=1}^N$, as $U^t = \{u_i^t\}_{i=1}^N$ is utilized during to training pass semantic knowledge and is not utilized during performance of SLU operations. As such, it should also be appreciated that this enables end-to-end integration of dialogue history in SLU operations.

FIG. 8A illustrates a chart representation 801 of the impact of dropping frames during the training process in accordance with one or more embodiments described herein.

Column 810 shows the number of maximum frames used in training experiments. For example, a number of frames were dropped until the number of frames used in a training experiment equaled the number of max frames in Column 810. Column 812 shows the F1 score of training experiments with different numbers of max frames. F1 score is a value used to measure the accuracy of a trained model and is determined based on a harmonic mean of the precision and recall of the model. Column 814 shows the training time of training experiments utilizing the various maximum number of speech frames as measured in minutes per epoch.

As shown, row 816 represents a training experiment utilizing a maximum of 256 frames. Row 818 represents a training experiment utilizing all speech frames. As shown, row 816 shows a decrease in training time (e.g., 8 min/epoch as opposed to 27 min/epoch). Accordingly, as shown dropping speech frames during the training process of spoken language understanding system 201 can provide a reduction in training time while simultaneously providing an increase in performance and accuracy (e.g., F1 score of 61.7 as opposed to F1 score of 59.9).

FIG. 8B illustrates a chart representation 802 of a comparison of the performance and model size of end-to-end models and an existing cascaded style model with gold transcripts in accordance with one or more embodiments described herein.

As shown, column 820 represents the model tested, column 822 represents the F1 score (e.g., performance) of the model, and column 824 represents the number of parameters used in the model (e.g., the size of the model). Row 825 represents an existing cascade model which comprises an automatic speech recognition component which converts speech into text tokens and then uses a BERT to encode the text context. Row 826 represents a hierarchical model as described above in relation to FIGS. 2 and 3 (e.g., a model utilizing utterance component 305 and conversation component 204) and utilizing contrastive loss in the training process. Row 827 represents a hierarchical model as described above in relation to FIGS. 2 and 3, utilizing contrastive loss in training in which the sequence encoder $g(.; \phi)$ utilized by conversation component 204 is replaced with a 1-layer bidirectional long short-term memory.

As shown, the hierarchical model in row 826 offers comparable performance (e.g., F1 score) to the exiting model shown in row 825, with a score of 61.7 compared to 62.2. Additionally, the hierarchical model in row 826 utilizes approximately half as many parameters as the existing model shown in row 825, with the hierarchical model in row 826 utilizing 88 parameters as opposed to 168 in the existing model shown in row 825. Additionally, the hierarchical model in row 827 offers a performance reduction (e.g., F1 score) of 0.9% when compared to the F1 score of the existing model shown in row 825, while being 64% smaller (e.g., number of parameters). Accordingly, it should be appreciated that both the hierarchical models shown in rows 826 and 827 offer similar performance to the existing cascade model shown in row 825, while also having reduced size and therefore making the hierarchical models more easily deployed.

FIG. 8C illustrates a chart representation 802 of a comparison of the performance and model size of end-to-end models and an existing cascaded style model without gold transcripts in accordance with one or more embodiments described herein.

As shown, column 830 represents the model tested, column 832 represents the F1 score (e.g., performance) of the model, and column 834 represents the number of parameters used in the model (e.g., the size of the model). Row 835 represents an existing cascade model which comprises an automatic speech recognition component which converts speech into text tokens and then uses a BERT to encode the text context. Row 836 represents a hierarchical model as described above in relation to FIGS. 2 and 3 (e.g., a model utilizing utterance component 305 and conversation component 204) and utilizing contrastive loss in the training process. As shown, the existing model represented in row 835 is susceptible to automatic speech recognition errors and therefor suffers a reduction in F1 score in comparison to the same model when used with gold transcripts as represented in row 825 of chart 802 described above. In contrast, the hierarchical model represented in row 836 has an F1 score of 10% higher than that of the existing model show in row 835, thereby illustrating that the hierarchical model represented in row 836 is end-to-end and therefore robust to ASR errors.

Figure 9:
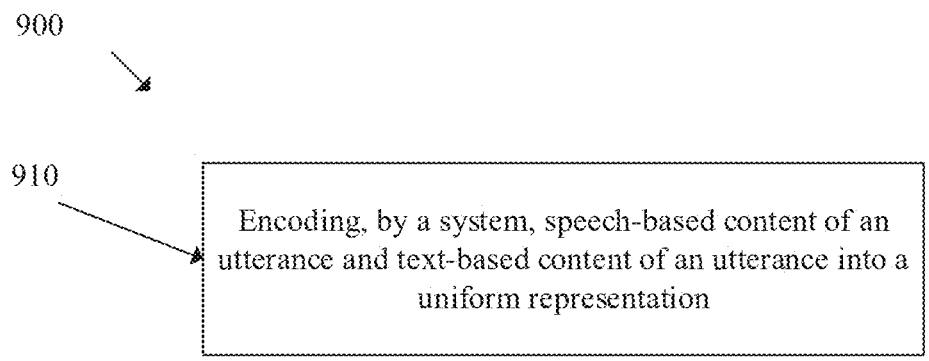
FIG. 9 illustrates a flow diagram of an example, non-limiting computer-implemented method that can facilitate end-to-end integration of dialogue history for spoken language understanding in accordance with one or more embodiments described herein.

FIG. 9 illustrates a flow diagram of an example, non-limiting computer-implemented method 900 that can facilitate end to end integration of dialogue history for spoken language understanding in accordance with one or more embodiments described herein. Repetitive description of like elements and/or processes employed in respective embodiments is omitted for sake of brevity.

At 910, computer-implemented method 900 can comprise encoding, by a system (e.g., spoken language understanding system 201, and/or conversation component 204) operatively coupled to a processor (e.g., processor 203), speech-based content of the utterance and text-based content of the utterance into a uniform representation. For example, as described above in reference to FIGS. 2-5, conversation component 204 can receive $U^s = \{u_i^s\}_{i=1}^N$ and $U^t = \{u_i^t\}_{i=1}^N$. Conversation component 204 can then encode $U^s$ and $U^t$ using the neural network higher level sequence encoder $g(.; \phi)$ to produce $c^s = g(U^s; \phi)$ and $c^t = g(U^t; \phi)$.

Figure 10:
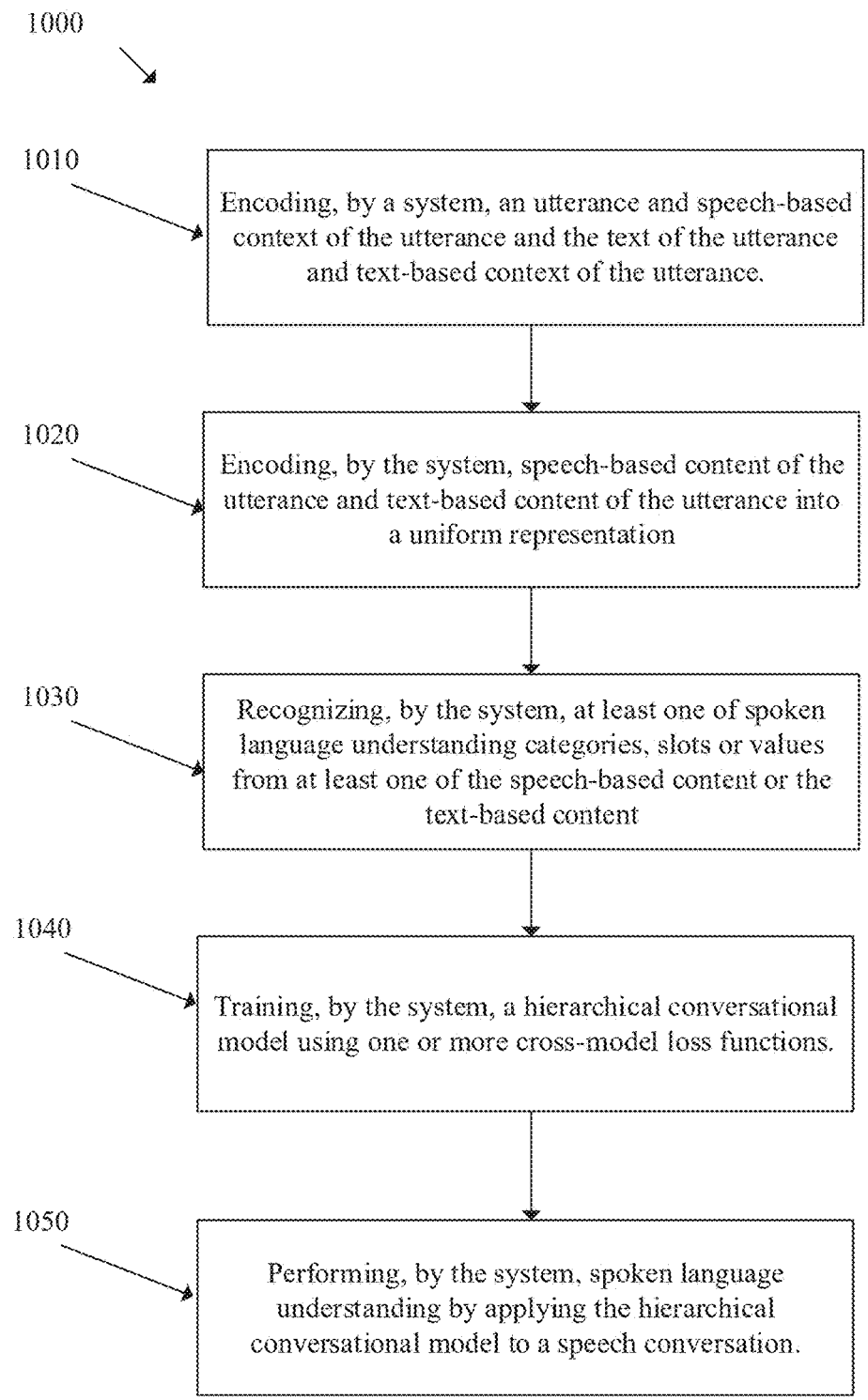
FIG. 10 illustrates a flow diagram of an example, non-limiting computer-implemented method that can facilitate end-to-end integration of dialogue history for spoken language understanding in accordance with one or more embodiments described herein.

FIG. 10 illustrates a flow diagram of an example, non-limiting computer-implemented method 1000 that can facilitate end to end integration of dialogue history for spoken language understanding in accordance with one or more embodiments described herein. Repetitive description of like elements and/or processes employed in respective embodiments is omitted for sake of brevity.

At 1010, computer-implemented method 1000 can comprise encoding, by a system (e.g., spoken language understanding system 201, utterance component 305, speech encoder component 410 and/or text encoder component 420) operatively coupled to a processor (e.g., processor 203), an utterance and speech-based context of the utterance and the text of the utterance and text-based context of the utterance.

At 1020, computer-implemented method 900 can comprise encoding, by the system (e.g., spoken language understanding system 201 and/or conversation component 204), speech-based content of the utterance and text-based content of the utterance into a uniform representation.

At 1030, computer-implemented method 1000 can comprise recognizing, by the system (e.g., spoken language understanding system 201 and/or recognition component 306), at least one of spoken language understanding categories, slots or values from at least one of the speech-based content or the text-based content.

At 1040, computer-implemented method 1000 can comprise training, by the system (e.g., spoken language understanding system 201 and/or training component 307), a hierarchical conversational model using one or more cross-model loss functions.

At 1050, computer-implemented method 1000 can comprise performing, by the system (e.g., spoken language understanding system 201 and/or neural network component 308), spoken language understanding by applying the hierarchical conversational model to a speech conversation.

Spoken language understanding system 201 can provide technological improvements to systems, devices, components, operation steps, and/or processing steps associated with spoken language understanding. For example, by training an end-to-end neural network to perform spoken language understanding using dialogue history in speech-from rather than text-form, spoken language understanding system 201 can utilize dialogue history as context when performing spoken language understanding without first converting the speech to text form. In another example, by dropping speech frames during training, spoken language understanding system 201 can decrease overall training time while also providing improved accuracy when performing spoken language understanding.

Spoken language understanding system 201 can provide technical improvements to a processing unit associated with spoken language understanding system 201. For example, by training utterance component 305 and conversation component 204 to perform spoken language understanding without the text of an utterance or conversation, and thereby decreasing the inputs used to perform spoken language understanding, spoken language understanding system 201 can reduce the workload of a processing unit (e.g., processor 203) that is employed to execute routines (e.g., instructions and/or processing threads) involved in performance of spoken language understanding. In another example, by dropping frames during the training process, spoken language understanding system 201 can decrease the number of instructions used during a training process while also improving accuracy of the trained model, thereby reducing the workload of the processing unit (e.g., processor 203) that is employed to execute the routines (e.g., instructions and/or processing threads) involved in training the model. In these examples, by reducing the workload of such a processing unit (e.g., processor 203), spoken language understanding system 201 can thereby facilitate improved performance, improved efficiency, and/or reduced computational cost associated with such a processing unit.

Spoken language understanding system 201 can provide technical improvements to a memory unit associated with spoken language understanding system 201. For example, by training utterance component 305 and conversation component 204 to perform spoken language understanding without text of an utterance or conversation, spoken language understanding system 201 can decrease the overall model size by not utilizing a speech to text conversion process, thereby reducing storage usage of spoken language understanding system 201.

Spoken language understanding system 201 can employ hardware and/or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above.

It is to be appreciated that spoken language understanding system 201 can utilize various combinations of electrical components, mechanical components, and circuity that cannot be replicated in the mind of a human or performed by a human as the various operations that can be executed by spoken language understanding system 201 and/or components thereof as described herein are operations that are greater than the capability of a human mind. For instance, the amount of data processed, the speed of processing such data, or the types of data processed by spoken language understanding system 201 over a certain period of time can be greater, faster or different than the amount, speed or data type that can be processed by a human mind over the same period of time.

According to several embodiments, spoken language understanding system 201 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that spoken language understanding system 201 can include information that is impossible to obtain manually by an entity, such as a human user. For example, the type, amount and/or variety of information included in spoken language understanding system 201, and/or conversation component 204, utterance component 305, recognition component 306, training component 307, and/or neural network component 308 can be more complex than information obtained manually by an entity, such as a human user.

Figure 11:
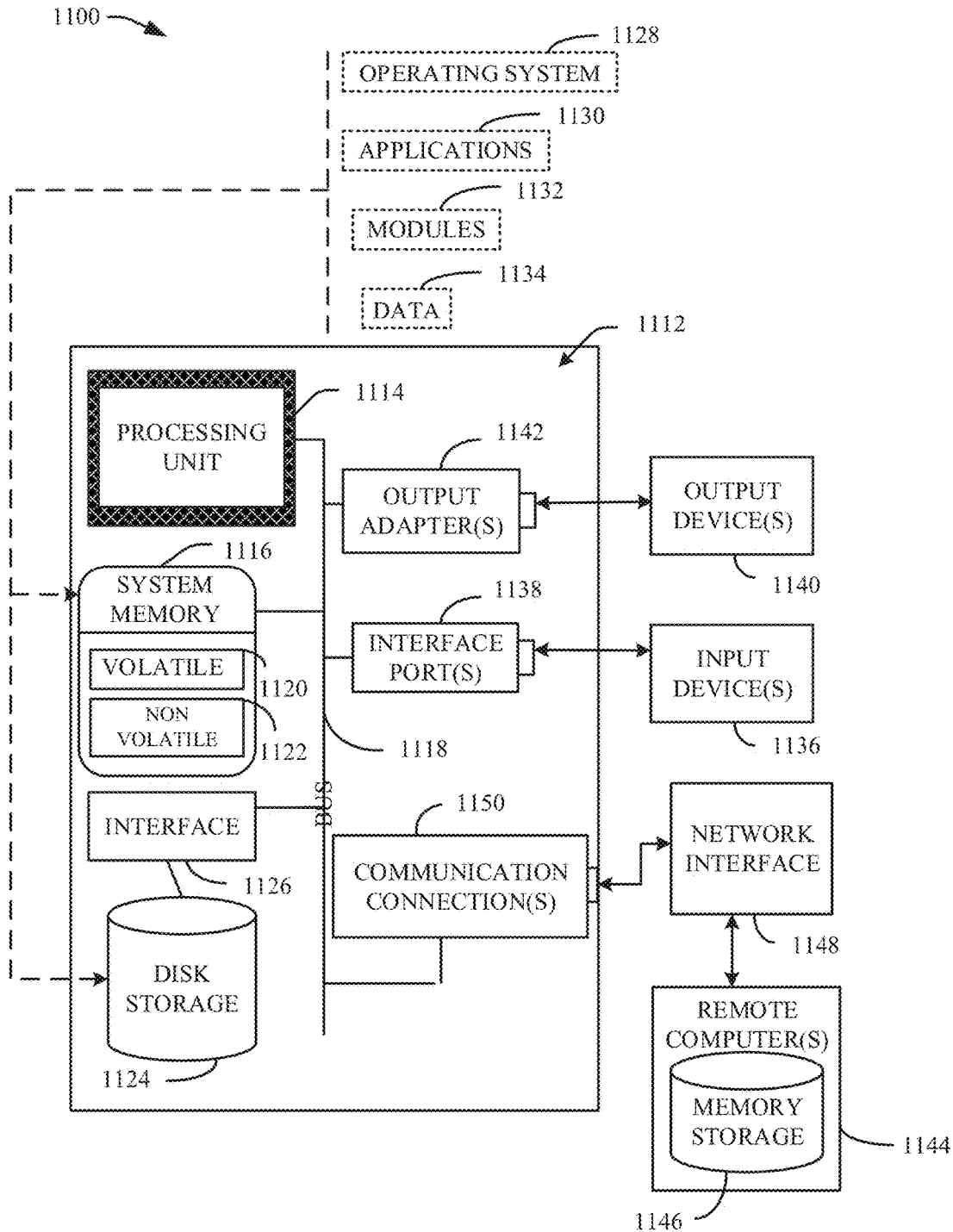
FIG. 11 illustrates a block diagram of an example, non-limiting operating environment in which one or more embodiments described herein can be facilitated.

In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity.

With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-110 drive, flash memory card, or memory stick. The disk storage 1124 also can include storage media separately or in combination with other storage media. To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112.

System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 846 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory that stores computer executable components;
   a processor that executes at least one of the computer executable components that:
   trains a hierarchical conversational neural network model to generate spoken language understandings directly of speech dialogs in an audio modality without converting the speech dialogs to a text modality, wherein the training comprises:
   encoding, using a text encoder of the hierarchical conversational neural network model, utterances of a training speech dialog in the audio modality, converted into the text modality, into first embeddings in a uniform embedding representation;
   encoding, using a speech encoder of the hierarchical conversational neural network model, the utterances of the training speech dialog in the audio modality, without being converted into the text modality, into second embeddings in the uniform embedding representation; and
   training, using the first embeddings of the utterances in the text modality and the second embeddings of the utterances in the audio modality, a conversation encoder of the hierarchical conversational neural network model to generate a spoken language understanding of the training speech dialog in the audio modality without converting the training speech dialog to the text modality.

2. The system of claim 1, wherein the training of the hierarchical conversational neural network model further comprises:
   training, using the first embeddings of the utterances in the text modality, the speech encoder, to encode utterances of the speech dialogs in the audio modality into the second embeddings in the uniform embedding representation.

3. The system of claim 1, wherein the training of the hierarchical conversational neural network model further comprises:
   using one or more cross-model loss functions to transfer semantic knowledge from the text encoder to at least one of the speech encoder or the conversation encoder.

4. The system of claim 1, wherein the at least one of the computer executable components further:
   generates, using the hierarchical conversational neural network model, a spoken language understanding of at least a portion of a speech dialog in the audio modality without converting the speech dialog to the text modality.

5. The system of claim 1,
   wherein the speech encoder is a student in a student-teacher joint training framework; and
   wherein the text encoder is a teacher in the student-teacher joint training framework.

6. The system of claim 1, wherein the training of the hierarchical conversational neural network model further comprises dropping one or more speech frames of the training speech dialog during the training based on a hyper-parameter.

7. The system of claim 3, wherein the one or more cross-model loss functions comprise at least one of a Euclidean loss function or a Contrastive loss function.

8. A computer-implemented method comprising:
   training, by a system operatively coupled to a processor, a hierarchical conversational neural network model to generate spoken language understandings directly of speech dialogs in an audio modality without converting the speech dialogs to a text modality, wherein the training comprises:
   encoding, using a text encoder of the hierarchical conversational neural network model, utterances of a training speech dialog in the audio modality, converted into the text modality, into first embeddings in a uniform embedding representation;
   encoding, using a speech encoder of the hierarchical conversational neural network model, the utterances of the training speech dialog in the audio modality, without being converted into the text modality, into second embeddings in the uniform embedding representation; and
   training, using the first embeddings of the utterances in the text modality and the second embeddings of the utterances in the audio modality, a conversation encoder of the hierarchical conversational neural network model to generate a spoken language understanding of the training speech dialog in the audio modality without converting the training speech dialog to the text modality.

9. The computer-implemented method of claim 8, wherein the training of the hierarchical conversational neural network model further comprises:
   training, using the first embeddings of the utterances in the text modality, the speech encoder, to encode utterances of the speech dialogs in the audio modality into the second embeddings in the uniform embedding representation.

10. The computer-implemented method of claim 8, wherein the training of the hierarchical conversational neural network model further comprises:
using one or more cross-model loss functions to transfer semantic knowledge from the text encoder to at least one of the speech encoder or the conversation encoder.

11. The computer-implemented method of claim 8, further comprising:
generating, by the system, using the hierarchical conversational neural network model, a spoken language understanding of at least a portion of a speech dialog in the audio modality without converting the speech dialog to the text modality.

12. The computer-implemented method of claim 8, wherein the speech encoder is a student in a student-teacher joint training framework, and the text encoder is a teacher in the student-teacher joint training framework.

13. The computer-implemented method of claim 8, wherein the training of the hierarchical conversational neural network model further comprises:
dropping one or more speech frames of the training speech dialog during the training based on a hyperparameter.

14. The computer-implemented method of claim 10, wherein the one or more cross-model loss functions comprise at least one of a Euclidean loss function or a Contrastive loss function.

15. A computer program product comprising a computer readable storage medium having program instructions embodied therewith, the program instructions executable by a processor to cause the processor to:
train a hierarchical conversational neural network model to generate spoken language understandings directly of speech dialogs in an audio modality without converting the speech dialogs to a text modality, wherein the training comprises:
encoding, using a text encoder of the hierarchical conversational neural network model, utterances of a training speech dialog in the audio modality, converted into the text modality, into first embeddings in a uniform embedding representation;
encoding, using a speech encoder of the hierarchical conversational neural network model, the utterances of the training speech dialog in the audio modality, without being converted into the text modality, into second embeddings in the uniform embedding representation; and
training, using the first embeddings of the utterances in the text modality and the second embeddings of the utterances in the audio modality, a conversation encoder of the hierarchical conversational neural network model to generate a spoken language understanding of the training speech dialog in the audio modality without converting the training speech dialog to the text modality.

16. The computer program product of claim 15, wherein the training of the hierarchical conversational neural network model further comprises:
training, using the first embeddings of the utterances in the text modality, the speech encoder, to encode utterances of the speech dialogs in the audio modality into the second embeddings in the uniform embedding representation.

17. The computer program product of claim 15, wherein the training of the hierarchical conversational neural network model further comprises:
using one or more cross-model loss functions to transfer semantic knowledge from the text encoder to at least one of the speech encoder or the conversation encoder.

18. The computer program product of claim 15, wherein the program instructions are further executable by the processor to cause the processor to:
generate, using the hierarchical conversational neural network model, a spoken language understanding of at least a portion of a speech dialog in the audio modality without converting the speech dialog to the text modality.

19. The computer program product of claim 15, wherein the training of the hierarchical conversational neural network model further comprises:
dropping one or more speech frames are dropped during training based on a hyperparameter.

20. The computer program product of claim 17, wherein the one or more cross-model loss functions comprise at least one of a Euclidean loss function or a Contrastive loss function.

* * * * *